(12) United States Patent
Henry et al.

(10) Patent No.: US 11,374,839 B1
(45) Date of Patent: Jun. 28, 2022

(54) OPTIMIZING MEDIA STREAMING BY A BITRATE-CONTROLLING DEVICE

(71) Applicant: Meta Platforms, Inc., Menlo Park, CA (US)

(72) Inventors: Colleen Kelly Henry, Oakland, CA (US); Caitlin Christina O'Callaghan, Santa Clara, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/110,142

(22) Filed: Dec. 2, 2020

(51) Int. Cl.
| | | |
|---|---|---|
| *H04L 43/0894* | (2022.01) | |
| *H04L 1/08* | (2006.01) | |
| *H04L 43/12* | (2022.01) | |
| *H04L 65/60* | (2022.01) | |
| *H04L 43/16* | (2022.01) | |

(52) U.S. Cl.
CPC ............ *H04L 43/0894* (2013.01); *H04L 1/08* (2013.01); *H04L 43/12* (2013.01); *H04L 43/16* (2013.01); *H04L 65/60* (2013.01)

(58) Field of Classification Search
CPC ..... H04L 43/0894; H04L 65/60; H04L 43/16; H04L 1/08; H04L 43/12
See application file for complete search history.

(56) References Cited

U.S. PATENT DOCUMENTS

| | | | |
|---|---|---|---|
| 2016/0255531 A1* | 9/2016 | Stein ...................... | H04L 65/60 |
| | | | 455/575.1 |
| 2018/0352057 A1* | 12/2018 | Li ........................... | H04L 45/24 |
| 2019/0044844 A1* | 2/2019 | Wu ....................... | H04L 1/0076 |
| 2019/0089964 A1* | 3/2019 | Sze ..................... | H04N 21/2343 |
| 2019/0149868 A1* | 5/2019 | Singh ................ | H04N 21/2662 |
| | | | 709/231 |
| 2020/0007823 A1* | 1/2020 | Ophir ................... | H04N 19/152 |
| 2020/0112726 A1* | 4/2020 | Liu ......................... | H04L 65/80 |
| 2020/0177652 A1* | 6/2020 | Halepovic ........... | H04L 65/4084 |

* cited by examiner

*Primary Examiner* — Nicholas R Taylor
*Assistant Examiner* — Sanjoy Roy
(74) *Attorney, Agent, or Firm* — Baker Botts L.L.P.

(57) ABSTRACT

In one embodiment, an apparatus includes one or more ports for coupling to an external media-capturing device, wherein the one or more ports are configured to receive a media stream from the external media-capturing device and send an instruction to the external media-capturing device to control a bitrate of the media stream, a network connector configured to communicate with an edge device that provides access to a network, a retransmission unit configured to retransmit the media stream to the network through the network connector and the edge device, and a control unit configured to monitor the retransmission unit to determine a performance metric associated with a retransmission of the media stream and send an instruction through the one or more ports to the external media-capturing device to reduce the bitrate of the media stream in response to a determination that the performance metric fails to satisfy a predetermined criterion.

14 Claims, 7 Drawing Sheets

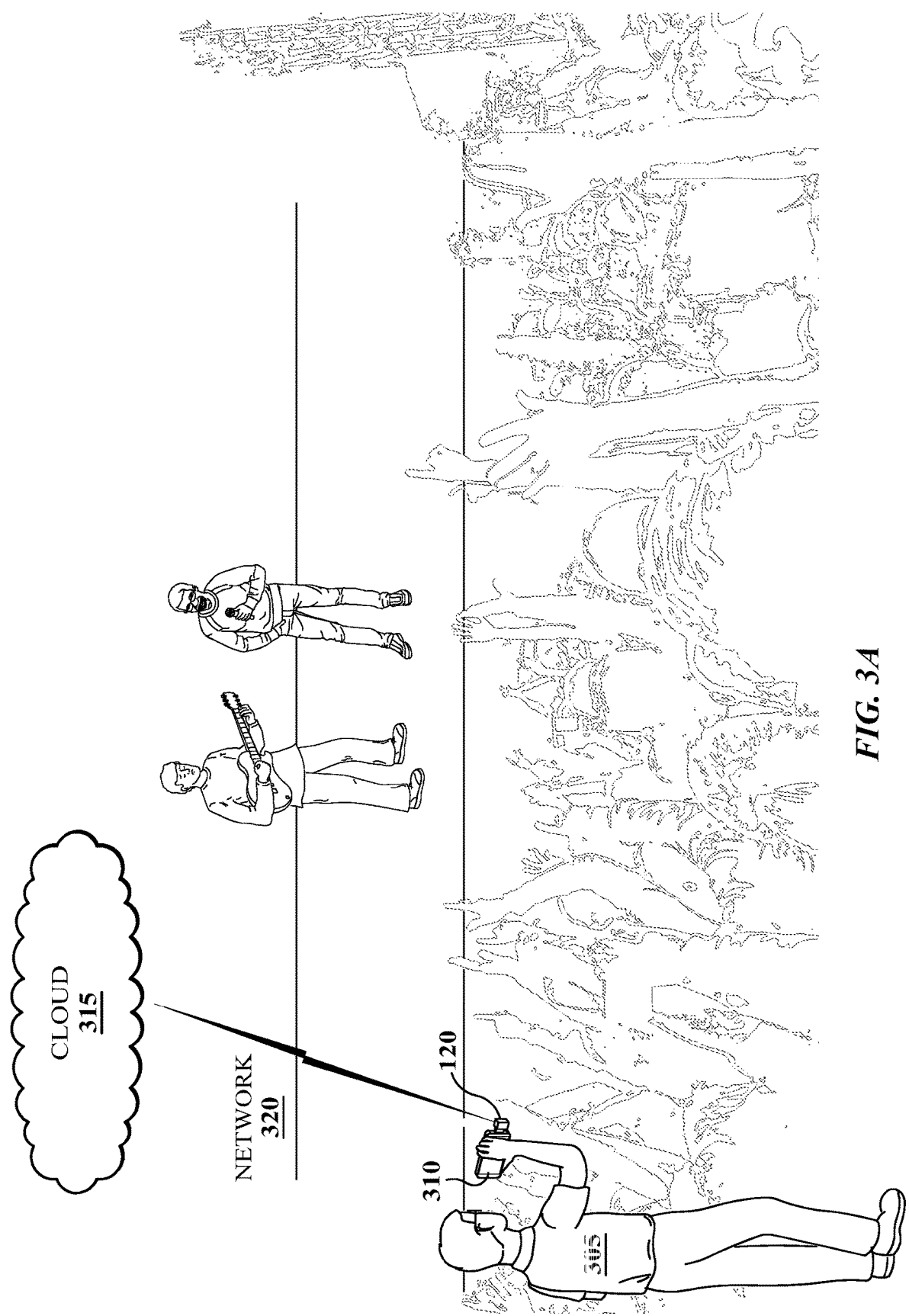

US 11,374,839 B1

OPTIMIZING MEDIA STREAMING BY A BITRATE-CONTROLLING DEVICE

TECHNICAL FIELD

This disclosure generally relates to databases and file management within network environments, and in particular relates to hardware for efficient data streaming.

BACKGROUND

Streaming data is data that is continuously generated by different sources. Such data should be processed incrementally using stream processing techniques without having access to all of the data. In addition, it should be considered that concept drift may happen in the data which means that the properties of the stream may change over time. It is usually used in the context of big data in which it is generated by many different sources at high speed. Data streaming can also be explained as a technology used to deliver content to devices over the internet, and it allows users to access the content immediately, rather than having to wait for it to be downloaded. Big data is forcing many organizations to focus on storage costs, which brings interest to data streams. A data stream can perform real-time analysis on streaming data without having to store the data first.

Live streaming refers to online streaming media simultaneously recorded and broadcast in real time. It is often referred to simply as streaming, but this abbreviated term is ambiguous because "streaming" may refer to any media delivered and played back simultaneously without requiring a completely downloaded file. Live stream services encompass a wide variety of topics, from social media to video games to professional sports. Platforms include the streaming of scheduled promotions and celebrity events as well as streaming between users, as in videotelephony. Live coverage of sporting events is a common application.

SUMMARY OF PARTICULAR EMBODIMENTS

In particular embodiments, a plug-and-go relay server may maximize the quality of media (e.g., live video) streaming and prevent rebuffering from media streams by automatically adjusting the media streaming to react in real time to the quality of the network. If the network is facing low bandwidth, high-bitrate media stream may cause more media data than what can be handled by the network, which may lead to buffering. Buffering in media streaming is disturbing for user experience. To address such issue, the relay server may toggle the bitrate, which in turn toggles the media quality to keep the live media streaming rolling rather than having it freeze due to buffering. Specifically, a reactive bitrate-control module may be implemented in the relay server. A media-capturing device, e.g., a camera for capturing videos, may be outputting a media stream. The media stream may go through the relay server, which then retransmits the media stream to a destination server. In order to control the bitrate, the logic of the reactive bitrate-control module may constantly check the network conditions to see if there is congestion or not and then appropriately adjust the bitrate of the media-capturing device. The logic of the reactive bitrate-control module may measure congestion by monitoring the local buffer and then instruct the encoder of the media-capturing device to decrease the bitrate if there is congestion or increase the bitrate if there is enough bandwidth. As a result, the media streaming may adapt to the available bandwidth, which results in optimal quality given the available bandwidth while ensuring reliability. Although this disclosure describes controlling bitrate of particular data stream by particular systems in a particular manner, this disclosure contemplates controlling bitrate of any suitable data stream by any suitable system in any suitable manner.

In particular embodiments, an apparatus may comprise one or more ports for coupling to an external media-capturing device. The one or more ports may be configured to (1) receive a media stream from the external media-capturing device and (2) send an instruction to the external media-capturing device to control a bitrate of the media stream. The apparatus may additionally comprise a network connector configured to communicate with an edge device that provides access to a network. In particular embodiments, the apparatus may also comprise a retransmission unit configured to retransmit the media stream to the network through the network connector and the edge device. The apparatus may further comprise a control unit. The control unit may be configured to monitor the retransmission unit to determine a performance metric associated with a retransmission of the media stream. In particular embodiments, the control unit may be further configured to, in response to a determination that the performance metric fails to satisfy a predetermined criterion, send, through the one or more ports, an instruction to the external media-capturing device to reduce the bitrate of the media stream.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3A illustrates an example scenario for using the reactive bitrate system to live stream a concert.

DESCRIPTION OF EXAMPLE EMBODIMENTS

Figure 1:
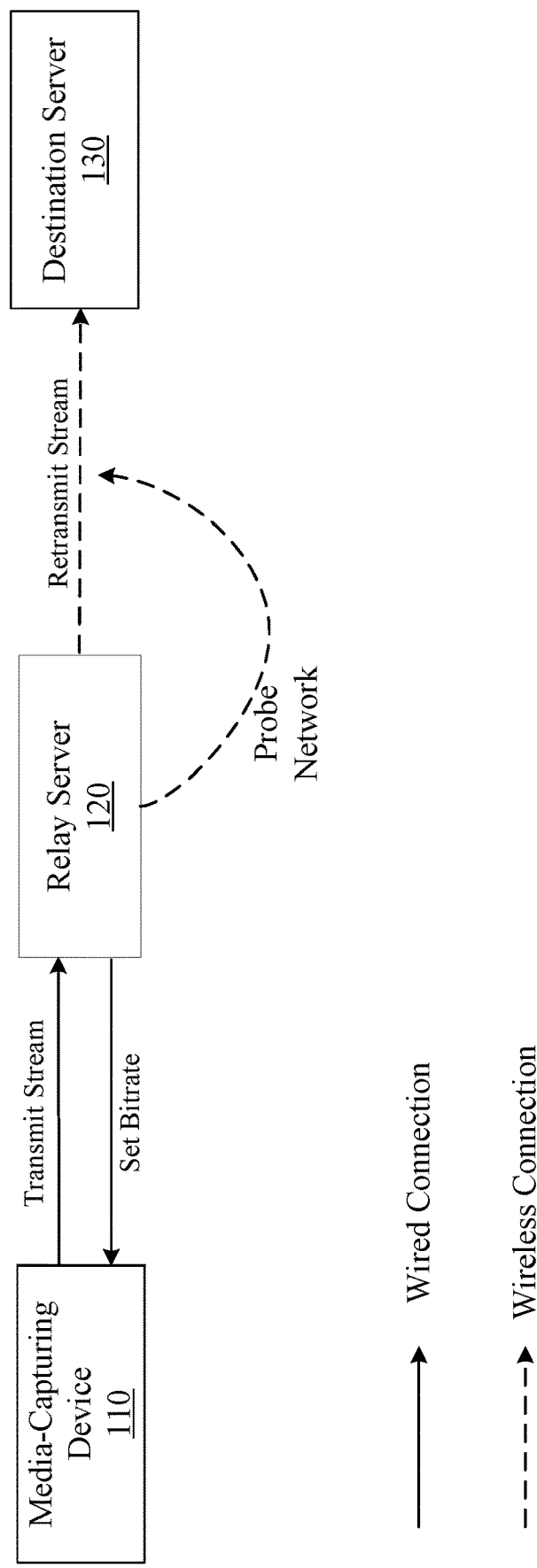
FIG. 1 illustrates an example architecture of a reactive bitrate system.

In particular embodiments, a plug-and-go relay server may maximize the quality of media (e.g., live video) streaming and prevent rebuffering from media streams by automatically adjusting the media streaming to react in real time to the quality of the network. If the network is facing low bandwidth, high-bitrate media stream may cause more media data than what can be handled by the network, which may lead to buffering. Buffering in media streaming is disturbing for user experience. To address such issue, the relay server may toggle the bitrate, which in turn toggles the media quality to keep the live media streaming rolling rather than having it freeze due to buffering. Specifically, a reactive bitrate-control module may be implemented in the relay server. A media-capturing device, e.g., a camera for capturing videos, may be outputting a media stream. The media stream may go through the relay server, which then retransmits the media stream to a destination server. In order to control the bitrate, the logic of the reactive bitrate-control module may constantly check the network conditions to see if there is congestion or not and then appropriately adjust the bitrate of the media-capturing device. The logic of the reactive bitrate-control module may measure congestion by monitoring the local buffer and then instruct the encoder of the media-capturing device to decrease the bitrate if there is congestion or increase the bitrate if there is enough bandwidth. As a result, the media streaming may adapt to the available bandwidth, which results in optimal quality given the available bandwidth while ensuring reliability. Although this disclosure describes controlling bitrate of particular data stream by particular systems in a particular manner, this disclosure contemplates controlling bitrate of any suitable data stream by any suitable system in any suitable manner.

In particular embodiments, an apparatus may comprise one or more ports for coupling to an external media-capturing device. The one or more ports may be configured to (1) receive a media stream from the external media-capturing device and (2) send an instruction to the external media-capturing device to control a bitrate of the media stream. The apparatus may additionally comprise a network connector configured to communicate with an edge device that provides access to a network. In particular embodiments, the apparatus may also comprise a retransmission unit configured to retransmit the media stream to the network through the network connector and the edge device. The apparatus may further comprise a control unit. The control unit may be configured to monitor the retransmission unit to determine a performance metric associated with a retransmission of the media stream. In particular embodiments, the control unit may be further configured to, in response to a determination that the performance metric fails to satisfy a predetermined criterion, send, through the one or more ports, an instruction to the external media-capturing device to reduce the bitrate of the media stream.

Live streams may have two main hops. One hop may be the media ingest or contribution stream from the creator to a destination server, e.g., a cloud platform. The other hop may be the media (e.g., video) delivery phase. These two parts of the streaming chain may have different needs when transcoding and large-scale media streaming is involved. Ingested media usually may only have one bitrate of media which may be transcoded into multiple adaptive bitrate (ABR) bitrate lanes. For live media ingest with only one contribution stream, one may measure the throughput of the network, and adjust the encoder in real time to send the highest quality without going over the bitrate budget. Normally, a live stream operator may do a speed test on a network, cut the results of the upload speed in half, and then set their encoder to that. This approach, however, may degrade the quality and may not adapt to large fluctuations of the network. Even worse, ingest rebuffering may mean everyone re-buffers, not just one viewer. Typically, encoders may not adapt in this situation. Different from the aforementioned conventional approaches, the embodiments disclosed herein may allow for live media ingest to perform reactive bitrate media stream controlling by implementing reactive bitrate-controlling module within a relay server. The embodiments disclosed herein may create the feedback loop between the network and encoder of a media-capturing device. The network may be first probed to determine the throughput. Then, the throughput information may be used to change the encoder's bitrate, which may increase or decrease the throughput.

The embodiments disclosed herein may be used in different real-world scenarios. As an example and not by way of limitation, the embodiments disclosed herein may be used in live question and answering (Q&A). As another example and not by way of limitation, the embodiments disclosed herein may be used to achieve 4 k broadcast quality when talents/influencers/content creators are streaming from their own home, especially when most of them use their laptops or phones to stream. Once the streaming signal reaches the destination server (e.g., the cloud), the stream may be altered based on production services. As yet another example and not by way of limitation, the embodiments disclosed herein may be used in large venues for live streaming of a huge event such as a concert, a sports game, etc. As yet another example and not by way of limitation, the embodiments disclosed herein may be used for live streaming virtual-reality (VR) data which requires considerable bandwidth and quality because VR data may have much more pixels than images or videos.

FIG. 1 illustrates an example architecture of a reactive bitrate system. In particular embodiments, the reactive bitrate system may comprise three main components: a media-capturing device 110 (e.g., a camera), a relay server 120, and a destination server 130. As an example and not by way of limitation, the external media-capturing device 110 may comprise one or more of a camera, a computing device, an augmented-reality equipment, a virtual-reality equipment, a pair of smart glasses, a smart phone, or a storage. The media-capturing device 110 may be responsible for encoding media data. The media-capturing device 110 and the relay server 120 may be connected via wired connection whereas the relay server 120 and the destination server 130 may be connected via wireless connection. In particular embodiments, the media-capturing device 110 may transmit media stream to the relay server 120. As an example and not by way of limitation, the media stream may comprise one or more of a text stream, an audio stream, an image stream, a video stream, an augmented-reality data stream, or a virtual-reality data stream. The relay server 120 may retransmit the stream to the destination server 130. In addition, the relay server 120 may probe the network connecting the relay server 120 and the destination server 130. Based on the probing, the relay server 120 may send instructions to the media-capturing device 110 to set the bitrate of the media stream. Although this disclosure describes particular architecture of particular systems in a particular manner, this disclosure contemplates any suitable architecture of any suitable system in any suitable manner.

In particular embodiments, the relay server 120 may be an intelligent data ingest edge server edge. The relay server 120 may be on-site and media-streaming oriented. In particular embodiments, the relay server 120 may communicate with an edge device which provides an entry point into enterprise or service provider core networks. As an example and not by way of limitation, the edge device may be a router, a routing switch, an integrated access device (IAD), a multiplexer, a metropolitan area network (MAN) access device, or a wide area network (WAN) access device. In particular embodiments, the relay server 120 may comprise the edge device. Although this disclosure describes particular server in a particular manner, this disclosure contemplates any suitable server in any suitable manner.

In particular embodiments, the reactive bitrate-control module in the relay server 120 may be a separate entity from the media-capturing device. In alternative embodiments, the reactive bitrate-control module may be implemented in the media-capturing device 110 itself. The relay server 120 may be put on-site for taking in media streams (e.g., video or IP data) and retransmit them to the destination server 130 via the network. The relay server 120 may be used in any type of data transmission scenarios. As an example and not by way of limitation, the relay server 120 may take in IP data streams and retransmit them across a fluctuating or WASI network, and instruct media-capturing devices 110 to respond accordingly to maximize quality and reliability of the media streaming. Although this disclosure describes particular module of particular server in a particular manner, this disclosure contemplates any suitable module of any suitable server in any suitable manner.

Figure 2:
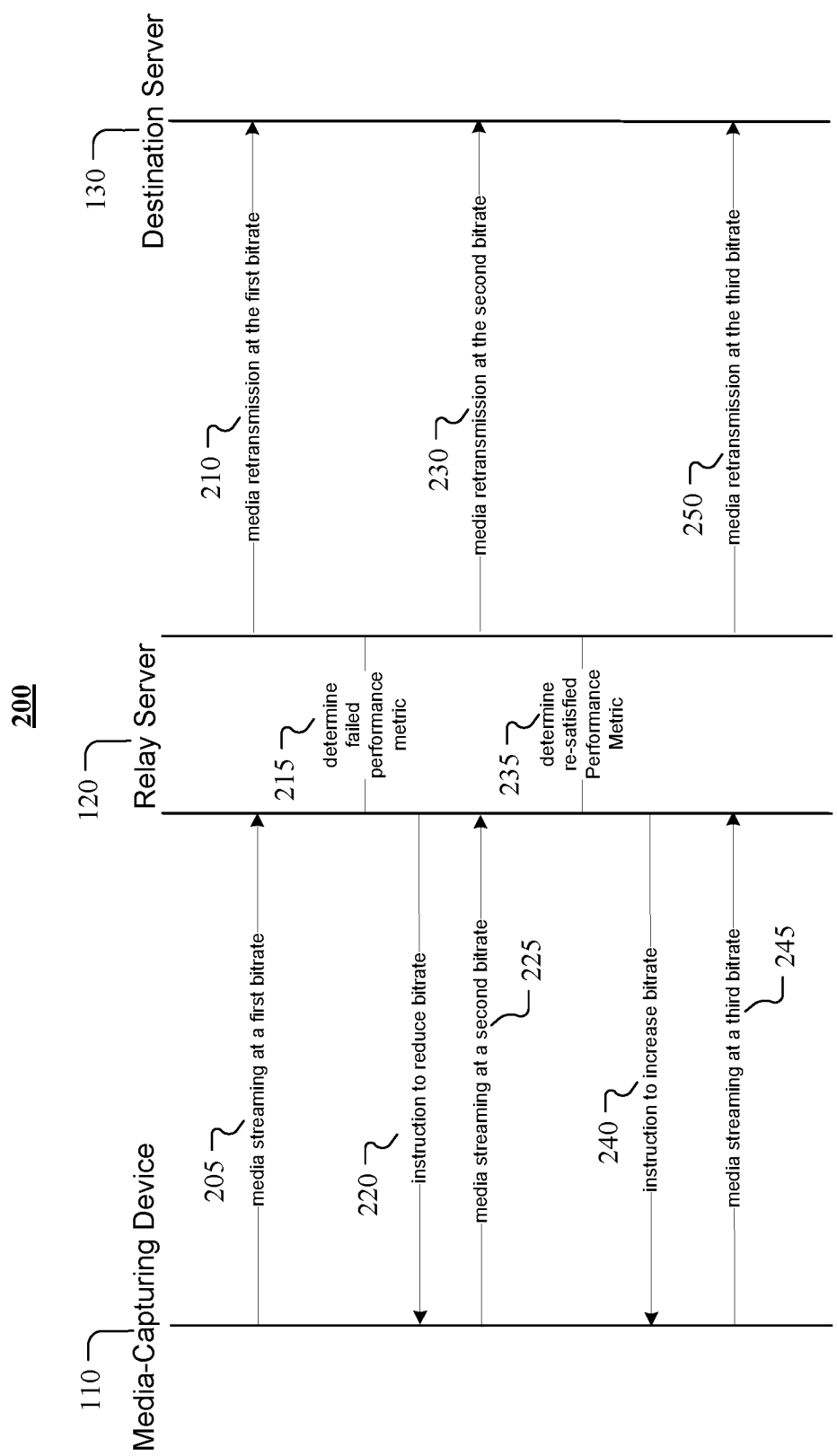
FIG. 2 illustrates an example workflow of controlling the bitrate of a media stream.

FIG. 2 illustrates an example workflow of controlling the bitrate of a media stream. Taking live video streaming as an example, the workflow may be illustrated as follows. The media-capturing device, e.g., a camera, may be used to capture videos. The camera may have an HDMI connection on it which transmits uncompressed live video signal, e.g., at 1.5 gigabytes raw data per second, which makes it impossible to send across the internet. As a result, the raw data may need to be compressed. The raw data may be put into a second device, i.e., an encoder, which compresses it and streams it. As an example and not by way of limitation, a separate computer may server as an encoder. As another example and not by way of limitation, some cameras may have an encoder in them so they can stream videos out of it. In particular embodiments, the media stream may be based on a data transmission protocol. As an example and not by way of limitation, the data transmission protocol may be Secure Reliable Transport (SRT) protocol. The SRT protocol may allow the media-capturing device 110 to reliably send the media stream across the internet. Furthermore, the SRT protocol may allow one to break up the media stream across lots of internet connections to make the media streaming even more reliable. In particular embodiments, the data transmission protocol may be associated with one or more application programming interfaces (APIs) that allow one to control the encoders externally rather than having direct, internal access to the encoders. As an example and not by way of limitation, the APIs may be based on C++ code. Although this disclosure describes particular media-capturing devices in a particular manner, this disclosure contemplates any suitable media-capturing device in any suitable manner.

The live video stream may go through the relay server 120, which is not transcoding but just retransmitting the live video stream to the destination sever 130. As an example and not by way of limitation, the live video stream may be transmitted 205 from the media-capturing device 110 to the relay server 120 at a first bitrate and the relay server 120 may retransmit 210 it to the destination server 130 still at the first bitrate. In particular embodiments, the control unit of the relay server 120 may measure network congestion by monitoring the status of the video stream. The relay server 120 may determine the performance metric of the video streaming fails to satisfy the predetermined criterion 215. In particular embodiments, the performance metric may correspond to a bandwidth available at the network. Correspondingly, the predetermined criterion may be a threshold bandwidth. In particular embodiments, the determination that the performance metric fails to satisfy the predetermined criterion may comprise accessing network statistics based on a reference library associated with the one or more APIs. The accessed network statistics may indicate the performance metric fails to satisfy the predetermined criterion. In other words, the reference library may allow the relay server 120 to access the network statistics, which may provide an estimation of the available bandwidth. As an example and not by way of limitation, the network statistics may comprise statistics between the two sockets of where the relay server 120 is sending a media stream and then receiving another media stream, which may allow the relay server 120 to probe the network connection to see statistics including the number of packets sent, how many packets are in a browser, etc. Although this disclosure describes determining particular performance metric by particular servers in a particular manner, this disclosure contemplates determining any suitable performance metric by any suitable server in any suitable manner.

In particular embodiments, the relay server 120 may further comprise a buffer. Correspondingly, the performance metric may comprise an amount of storage available in the buffer and the predetermined criterion may comprise a predetermined threshold amount of storage. In particular embodiments, the determination that the performance metric fails to satisfy the predetermined criterion may comprise determining the amount of storage available in the buffer is below the threshold amount of storage. As an example and not by way of limitation, if the amount of media data in the buffer starts increasing it may indicate that that the media streaming is not going through fast enough due to network congestion. This way, the relay server 120 may use the size of the media data in the buffer as an indirect metric to determine whether there is sufficient bandwidth available. Although this disclosure describes determining particular performance metric by particular servers in a particular manner, this disclosure contemplates determining any suitable performance metric by any suitable server in any suitable manner.

Upon determining that the performance metric fails to satisfy the predetermined criterion, the relay server 120 may send an instruction 220 to the media-capturing device 110 to reduce the bitrate of the media stream. In particular embodiments, sending the instruction to the external media-capturing device 110 to reduce the bitrate of the media stream may be via the one or more APIs. The media-capturing device 110 may then transmit 225 media stream at a second bitrate, which may be lower than the first bitrate. As an example and not by way of limitation, the relay server 120 may instruct the media-capturing device 110 to turn down the bitrate by a substantial margin until the buffer stops increasing. The relay server 120 may then retransmit 230 the media stream to the destination server 130 at the second bitrate. Although this disclosure describes instructing particular devices to adjust particular data stream in a particular manner, this disclosure contemplates instructing any suitable device to adjust any suitable data stream in any suitable manner.

In particular embodiments, the relay server 120 may determine that the performance metric re-satisfies the predetermined criterion 235. In response to such determination, the relay server 120 may send, through the one or more ports, an instruction 240 to the external media-capturing device 110 to increase the bitrate of the media stream. After that, the media-capturing device 110 may transmit 245 media stream at a third bitrate, which may be higher than the second bitrate. The relay server 120 may then retransmit 250 the media stream to the destination server 130 at the third bitrate. A technical challenge here may include determining when and by how much to increase the bitrate of the media stream to optimally use the available bandwidth. An effective solution for addressing such technical challenge may be instructing the media-capturing device 110 to increase the bitrate of the media stream progressively. Every time before instructing the media-capturing device 110 to increase the bitrate, the relay server 120 may probe the buffer first. When the buffer has capacity, the media-capturing device 110 can increase the bitrate. However, the relay server 120 may instruct the media-capturing device 110 to slowly increase the bitrate without being too aggressive because the relay server 120 may need to determine the limit. Therefore, the third bitrate may be substantially lower than the first bitrate. As an example and not by way of limitation, if the bitrate previously went from 100 megabytes per second to 25 megabytes per second because there was a network fluctuation, the relay server 120 may instruct the media-capturing device 110 to increase the bitrate gradually to 26 megabytes per second, 27 megabytes per second, 29 megabytes per second, etc. until it hits the limit based on the probing of the buffer. Although this disclosure describes instructing particular devices to adjust particular data stream in a particular manner, this disclosure contemplates instructing any suitable device to adjust any suitable data stream in any suitable manner.

Figure 3B:
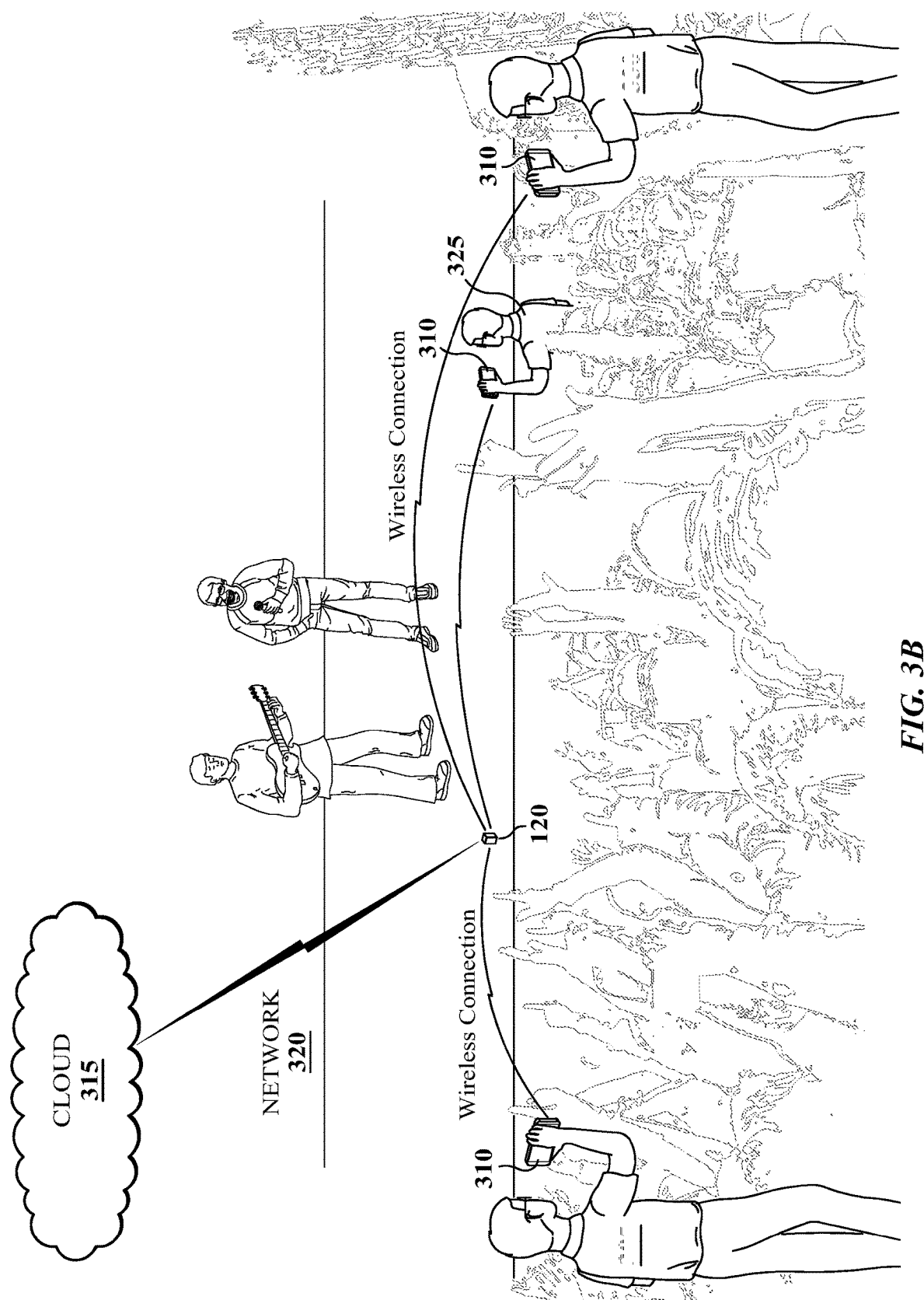
FIG. 3B illustrates another example scenario for using the reactive bitrate system to live stream a concert.

FIGS. 3A-3B illustrate example scenarios for using the reactive bitrate system to live stream a concert. FIG. 3A illustrates an example scenario for using the reactive bitrate system to live stream a concert. As illustrated in FIG. 3A, user 305 may be at a concert and live streaming the concert. There may be lots of people live streaming the concert as well. The reactive bitrate system may be particular useful for this scenario. The user may connect his phone 310 to the relay server 120, which may retransmit the video stream to the cloud 315 via the network 320. The relay server 120 may automatically instruct the user's phone 310 to adjust the bitrate of the video stream according to the network congestion, thereby maximizing the video quality based on the available network bandwidth.

FIG. 3B illustrates another example scenario for using the reactive bitrate system to live stream a concert. As illustrated in FIG. 3B, multiple users, e.g., user 305, user 325, and user 330 may be at the concert and live streaming the concert. As an example and not by way of limitation, the number of these users live streaming the concert may be up to 3000 or more. The reactive bitrate system may be particular useful for this scenario as well. These three users may connect their phones 310 wirelessly to the relay server 120, which may retransmit the video stream to the cloud 315 via the network 320. The relay server 120 may automatically instruct the users' phones 310 to adjust the bitrate of the video stream according to the network congestion, thereby maximizing the video quality based on the available network bandwidth.

Figure 4:
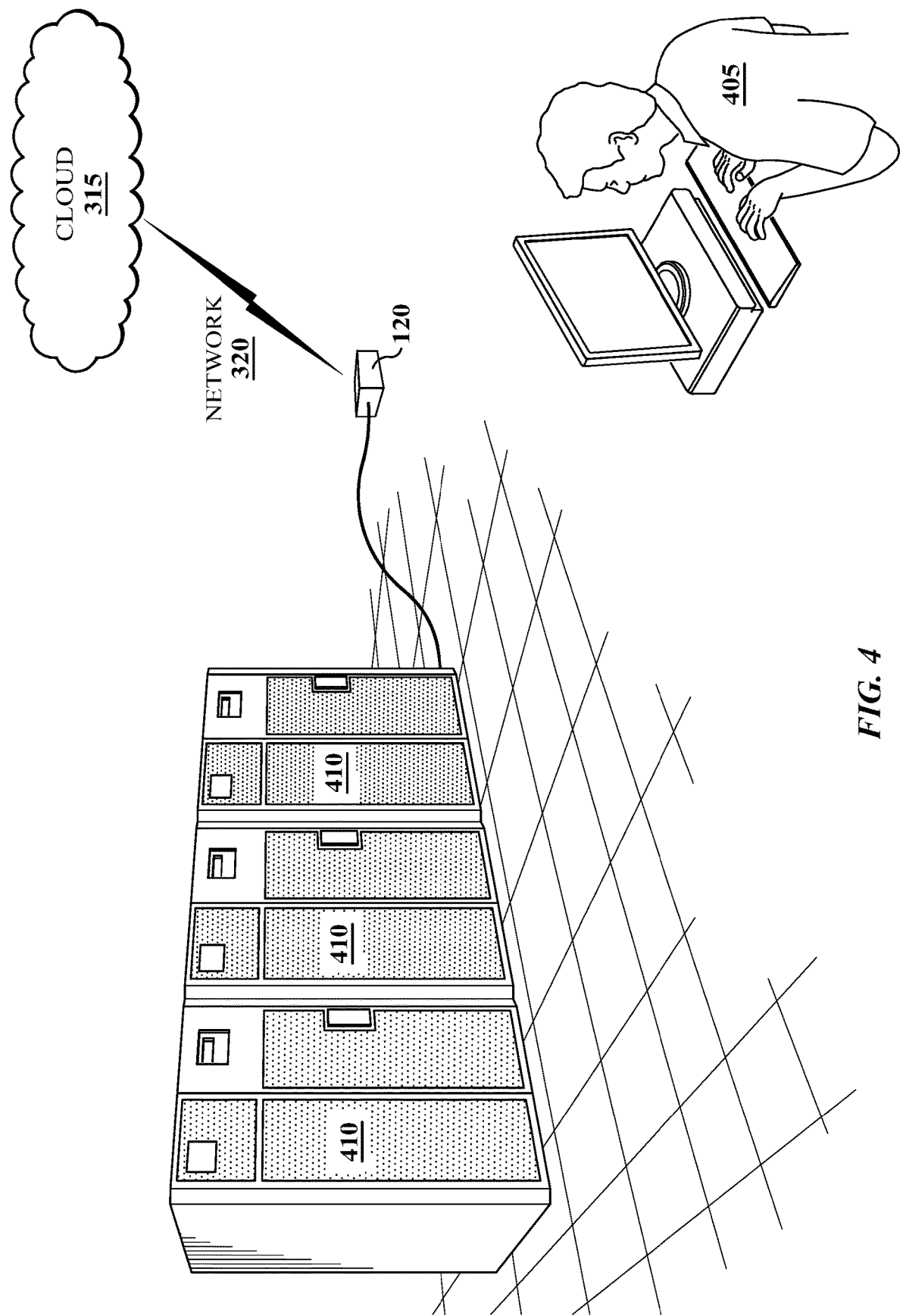
FIG. 4 illustrates an example scenario for using the reactive bitrate system for data transfer.

FIG. 4 illustrates an example scenario for using the reactive bitrate system for data transfer. As illustrated in FIG. 4, user 405 may need to transfer a large amount data to the cloud 315. It may be difficult to guarantee the best transfer rate when transferring such data via the network 325. Differently, the user 405 may go to the data storage center where the data is physically stored and connect the data storage 410 with the relay server 120. The relay server 120 can then retransmit the data to the cloud 315. The relay server 120 may automatically instruct the data storage 410 to adjust the bitrate of the data stream according to the network congestion, thereby maximizing the data transfer rate based on the available network bandwidth.

Figure 5:
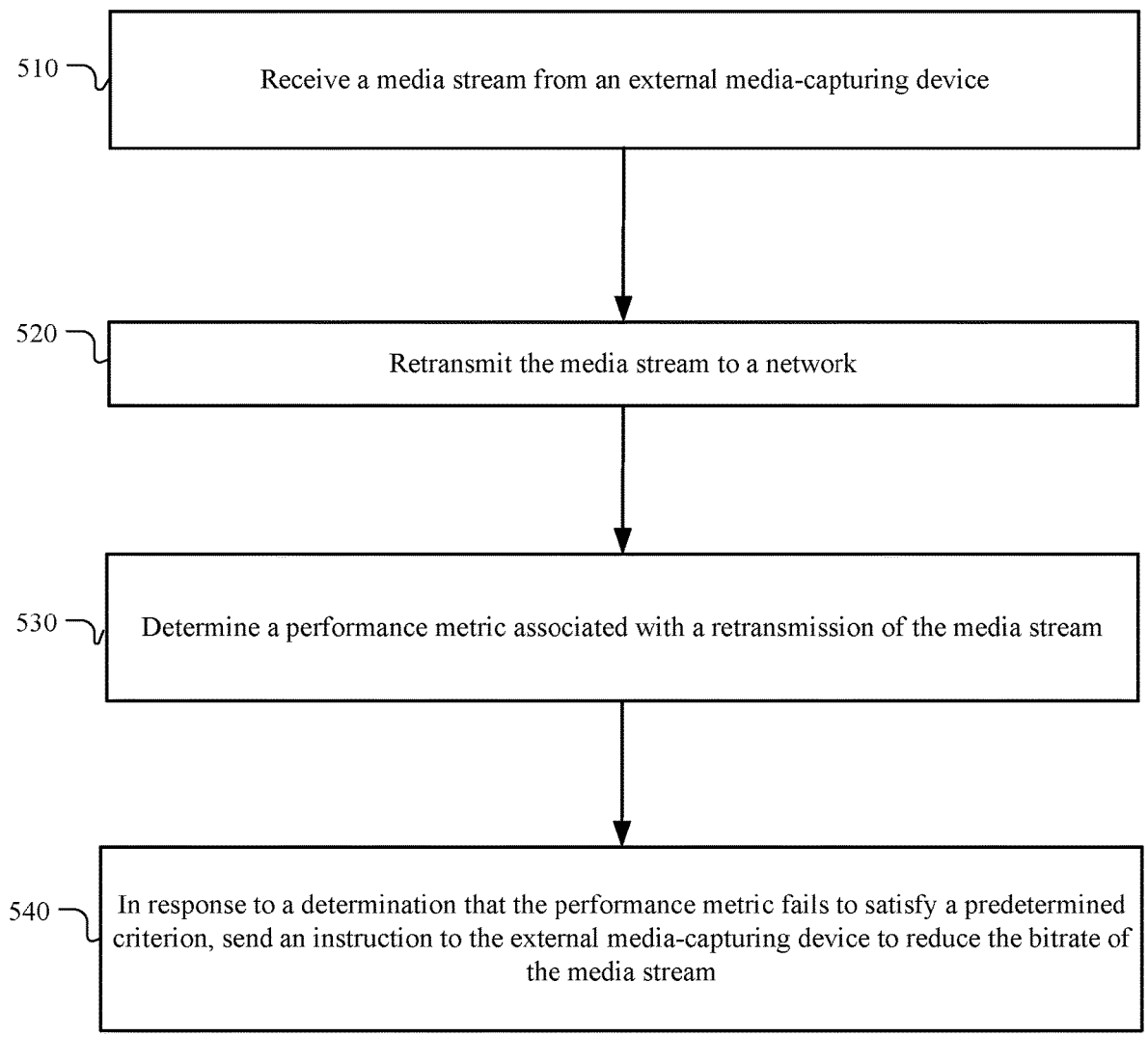
FIG. 5 illustrates an example method for controlling the bitrate of a media stream.

FIG. 5 illustrates an example method 500 for controlling the bitrate of a media stream. The method may begin at step 510, where an electronic device may receive a media stream from an external media-capturing device. At step 520, the electronic device may retransmit the media stream to a network. At step 530, the electronic device may determine a performance metric associated with a retransmission of the media stream. At step 540, the electronic device may, in response to a determination that the performance metric fails to satisfy a predetermined criterion, send an instruction to the external media-capturing device to reduce the bitrate of the media stream. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for controlling the bitrate of a media stream including the particular steps of the method of FIG. 5, this disclosure contemplates any suitable method for controlling the bitrate of a media stream including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
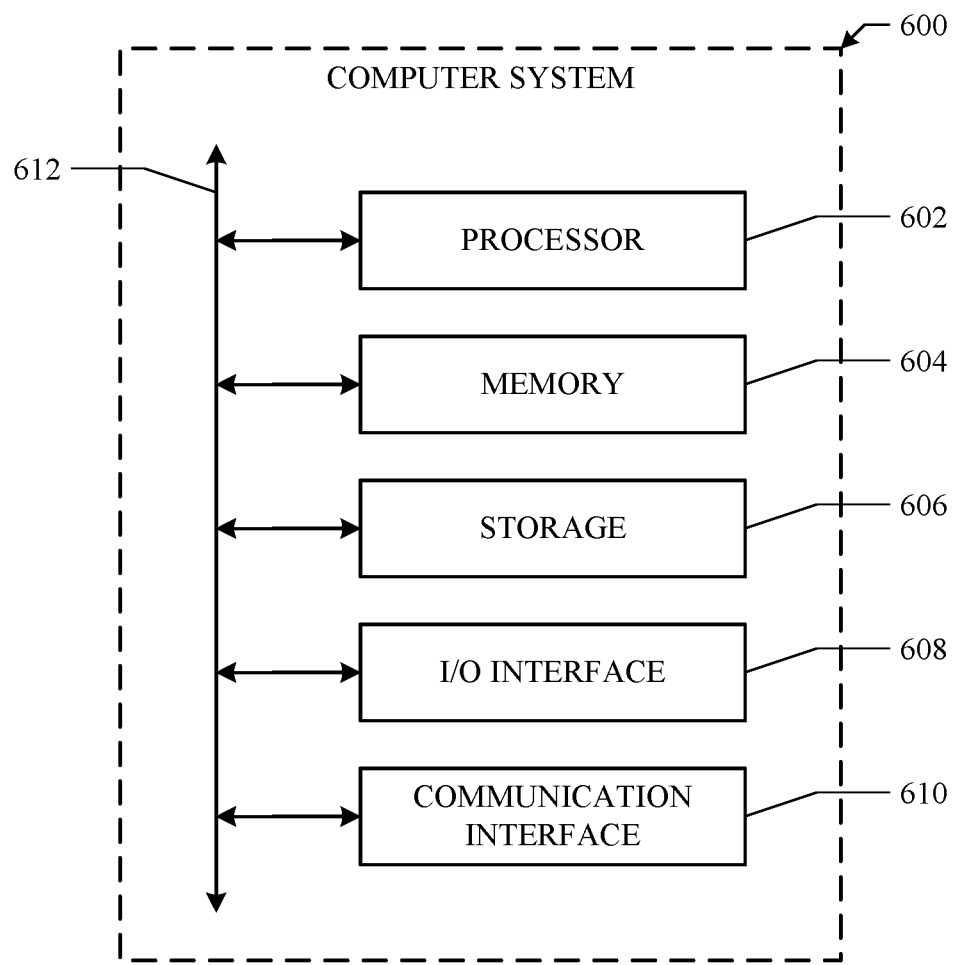
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A peripheral dongle for connecting a camera to a network, comprising:
   one or more ports for coupling to the camera, wherein the one or more ports are configured to (1) receive a media stream from the camera, and (2) send an instruction to the camera to control a bitrate of the media stream;
   a network connector configured to communicate with an edge device that provides access to the network;
   a retransmission unit configured to retransmit the media stream to the network through the network connector and the edge device;
   a buffer; and
   a control unit configured to:
      monitor the retransmission unit to determine a performance metric associated with a retransmission of the media stream;
      in response to a first determination that the performance metric fails to satisfy a predetermined criterion, send, through the one or more ports, a first instruction to the camera to reduce the bitrate of the media stream from a first bitrate to a second bitrate; and in response to a second determination that the performance metric re-satisfies the predetermined criterion, send, through the one or more ports, a second instruction to the camera to increase the bitrate of the media stream from the second bitrate to a third bitrate, wherein the third bitrate is lower than the first bitrate and higher than the second bitrate.

2. The peripheral dongle of claim 1, wherein the media stream comprises one or more of a text stream, an audio stream, an image stream, a video stream, an augmented-reality data stream, or a virtual-reality data stream.

3. The peripheral dongle of claim 1, wherein the performance metric comprises an amount of storage available in the buffer, wherein the predetermined criterion comprises a predetermined threshold amount of storage, and wherein the first determination that the performance metric fails to satisfy the predetermined criterion comprises:

determining the amount of storage available in the buffer is below the predetermined threshold amount of storage.

4. The peripheral dongle of claim 1, wherein the performance metric corresponds to a bandwidth available at the network.

5. The peripheral dongle of claim 1, wherein the media stream is based on a data transmission protocol, and wherein the data transmission protocol is associated with one or more application programming interfaces (APIs).

6. The peripheral dongle of claim 5, wherein sending the first instruction to the camera to reduce the bitrate of the media stream is via the one or more APIs.

7. The peripheral dongle of claim 5, wherein the first determination that the performance metric fails to satisfy the predetermined criterion comprises:

accessing network statistics based on a reference library associated with the one or more APIs, wherein the accessed network statistics indicates the performance metric fails to satisfy the predetermined criterion.

8. The peripheral dongle of claim 1, wherein the camera is associated with one or more of a computing device, an augmented-reality equipment, a virtual-reality equipment, a pair of smart glasses, a smart phone, or a storage.

9. A method comprising, by a peripheral dongle for connecting a camera to a network:

receiving a media stream from the camera;

retransmitting the media stream to the network;

determining a performance metric associated with a retransmission of the media stream;

in response to a first determination that the performance metric fails to satisfy a predetermined criterion, sending a first instruction to the camera to reduce the bitrate of the media stream from a first bitrate to a second bitrate; and in response to a second determination that the performance metric re-satisfies the predetermined criterion, sending a second instruction to the camera to increase the bitrate of the media stream from the second bitrate to a third bitrate, wherein the third bitrate is lower than the first bitrate and higher than the second bitrate.

10. The method of claim 9, wherein the media stream comprises one or more of a text stream, an audio stream, an image stream, or a video stream.

11. The method of claim 9, wherein the performance metric comprises an amount of storage available in the buffer, wherein the predetermined criterion comprises a predetermined threshold amount of storage, and wherein the first determination that the performance metric fails to satisfy the predetermined criterion comprises:

determining the amount of storage available in the buffer is below the predetermined threshold amount of storage.

12. A dongle system comprising: one or more processors; and a non-transitory memory coupled to the processors comprising instructions executable by the processors, the processors operable when executing the instructions to:

receive a media stream from a camera;

retransmit the media stream to a network;

determine a performance metric associated with a retransmission of the media stream;

in response to a first determination that the performance metric fails to satisfy a predetermined criterion, send a first instruction to the camera to reduce the bitrate of the media stream from a first bitrate to a second bitrate; and in response to a second determination that the performance metric re-satisfies the predetermined criterion, send a second instruction to the camera to increase the bitrate of the media stream from the second bitrate to a third bitrate, wherein the third bitrate is lower than the first bitrate and higher than the second bitrate.

13. The dongle system of claim 12, wherein the media stream comprises one or more of a text stream, an audio stream, an image stream, or a video stream.

14. The dongle system of claim 12, wherein the performance metric comprises an amount of storage available in the buffer, wherein the predetermined criterion comprises a predetermined threshold amount of storage, and wherein the first determination that the performance metric fails to satisfy the predetermined criterion comprises:

determining the amount of storage available in the buffer is below the predetermined threshold amount of storage.

* * * * *